(12) United States Patent
Chang et al.

(10) Patent No.: US 7,971,043 B2
(45) Date of Patent: Jun. 28, 2011

(54) ELECTRONIC SYSTEM AND METHOD FOR CHANGING NUMBER OF OPERATION STAGES OF A PIPELINE

(75) Inventors: Li-Hung Chang, Hsinchu (TW); Hong-Men Su, Hsinchu County (TW)

(73) Assignee: Andes Technology Corporation, Science-Based Industrial Park, Hsinchu (TW)

( * ) Notice: Subject to any disclaimer, the term of this patent is extended or adjusted under 35 U.S.C. 154(b) by 873 days.

(21) Appl. No.: 11/944,416

(22) Filed: Nov. 22, 2007

(65) Prior Publication Data

US 2009/0138674 A1   May 28, 2009

(51) Int. Cl.
*G06F 9/38* (2006.01)
*G06F 15/76* (2006.01)
(52) U.S. Cl. ................................ 712/229; 712/43
(58) Field of Classification Search ............. 712/43, 712/229
See application file for complete search history.

(56) References Cited

U.S. PATENT DOCUMENTS

| 5,937,177 | A | * | 8/1999 | Molnar et al. | 712/200 |
| 5,978,935 | A | * | 11/1999 | Kim et al. | 714/42 |
| 6,958,627 | B2 | * | 10/2005 | Singh et al. | 326/93 |
| 2003/0223469 | A1 | * | 12/2003 | Deng | 370/542 |
| 2003/0226000 | A1 | * | 12/2003 | Rhoades | 712/218 |

* cited by examiner

*Primary Examiner* — Daniel Pan
(74) *Attorney, Agent, or Firm* — Winston Hsu; Scott Margo

(57) ABSTRACT

An electronic system includes a pipeline having a first number of pipeline stages coupled in series, a pipeline control unit, and a logic engine, wherein each pipeline stage in the pipeline is for outputting data to a next pipeline stage at each cycle of a clock signal. The pipeline control unit is for changing the first number of pipeline stages in the pipeline to a second number of pipeline stages. The logic engine is for performing operations of the electronic system in a first mode by utilizing the pipeline having the first number of pipeline stages and for performing operations of the electronic system in a second mode by utilizing the pipeline having the second number of pipeline stages. A frequency control unit and a voltage control unit, coupled to the pipeline and the logic engine, respectively adjust the frequency and voltage of the electronic system accordingly.

11 Claims, 10 Drawing Sheets

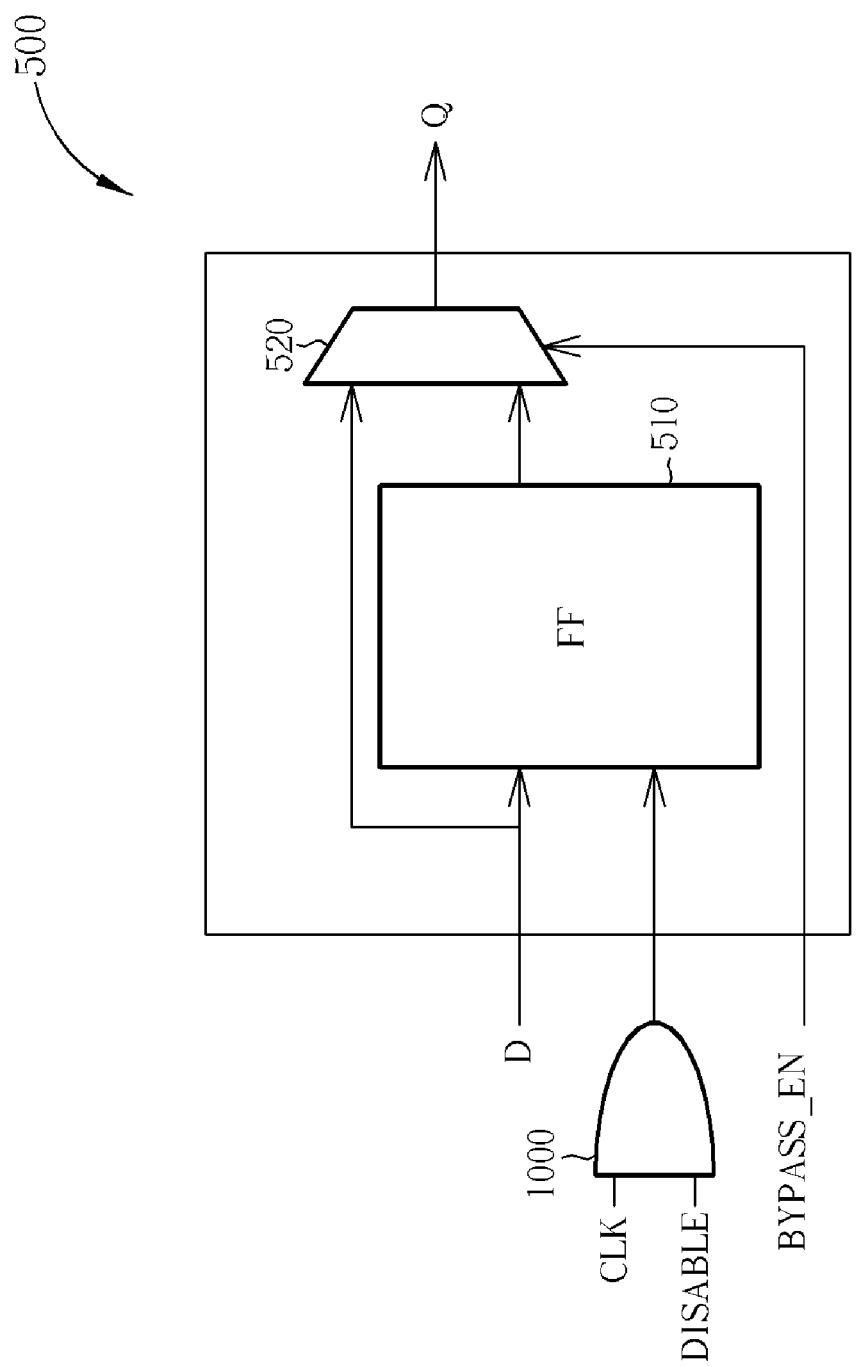

ELECTRONIC SYSTEM AND METHOD FOR CHANGING NUMBER OF OPERATION STAGES OF A PIPELINE

BACKGROUND OF THE INVENTION

1. Field of the Invention

The present invention relates to changing a pipeline structure of an electronic system, and more particularly, changing a number of pipeline stages in a pipeline structure of an electronic system.

2. Description of the Prior Art

As today's applications for electronic systems grow at ever-increasing rates, the demand for more efficient microprocessor performance is never ceasing. One design for improving the performance in a processor is the use of instruction pipelining. FIG. 9 shows a typical instruction pipeline for a central processing unit (CPU) according to the related art. Processors with pipelining are organized inside into stages, where each stage is organized and linked serially so that in one clock cycle, the logic in each pipeline stage is evaluated and ready to move to the next pipeline stage at the next clock cycle. For example, a generic 4-stage pipeline such as the pipeline 900 shown in FIG. 9 comprises four stages: fetch, decode, execute, and write-back. Almost every microprocessor manufactured today uses at least 2 stages of pipeline, and many designs include pipelines as long as 7, 10, and even 31 stages. This organization of the processor allows overall processing time to be significantly reduced, thus effectively increasing the performance of a processor.

Performance of a processor is measured by its ability to process computer instructions per unit of time. For any processor, the time needed (and thus a measurable performance indicator) to execute a given instruction set for a task can be analyzed as follows:

$$\text{time}(s) = \frac{icount}{freq * icount/ccount} \approx \frac{1}{frequency * IPC}$$

where icount is the total instruction count of the task (fixed for the task at hand), ccount is the total cycle count of the task (which is fixed for the processor), and IPC (instructions per cycle) is the average number of instructions that the given processor can execute per clock cycle. For a pipelined processor, a shorter pipeline leads to a higher IPC due to the adverse effects of pipeline bubbling and branching. While running on a same task at the same frequency, a processor with higher IPC leads to higher performance. In other words, a processor with higher IPC value can run at lower frequency to keep the same performance.

According to related art, processors manufactured today are designed with fixed pipeline structures suited to a general "best case" for the processor's intended purpose. Once a number of pipeline stages has been implemented into the pipeline structure design of the processor, the manufactured processors can lower power consumption only by changing the frequency and voltage as needed. The processor is thus subject to a tradeoff between power and performance: power consumption is directly proportional to processor's clock speed, so if the clock speed is reduced, the performance is proportionally decreased. The problem with current processors is that these parameters (changing the frequency or the voltage) cannot meet an optimum trade-off between high performance and low power consumption based on application requirements.

SUMMARY OF THE INVENTION

It is therefore an objective of the present invention to provide an electronic system whereby a pipeline structure can be modified to improve processing efficiency and reduce power requirements.

According to an exemplary embodiment of the claimed invention, an electronic system comprises a pipeline having a first number of pipeline stages being coupled in series; a pipeline control unit for changing the first number of pipeline stages in the pipeline to a second number of pipeline stages being coupled in series, the second number being different than the first number; and a logic engine for performing operations of the electronic system in a first mode by utilizing the pipeline having the first number of pipeline stages and for performing operations of the electronic system in a second mode by utilizing the pipeline having the second number of pipeline stages; wherein each pipeline stage in the pipeline is for outputting data to a next pipeline stage at each cycle of a clock signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 10 illustrates the pipeline stages of FIG. 5 where the bypassed input flip flop can be fed with a gated clock signal.

DETAILED DESCRIPTION

According to related art, current processors available today are unable to maintain processing performance while lowering power consumption, or to maintain (i.e., not increase) power consumption while increasing performance for those tasks. This is because, at any particular frequency, a shorter pipeline will lead to a higher IPC due to the adverse effects of pipeline bubbling and branching in a longer pipeline. Likewise, a longer pipeline will lead to a lower IPC and therefore the operating frequency of the pipeline must be increased to maintain the same performance. However, one benefit of longer pipelines is that the operating frequency of a longer pipeline can generally be raised much higher than that of a shorter pipeline that must perform the same operations. So systems that may require very high performance will generally require a longer length pipeline.

Figure 1:
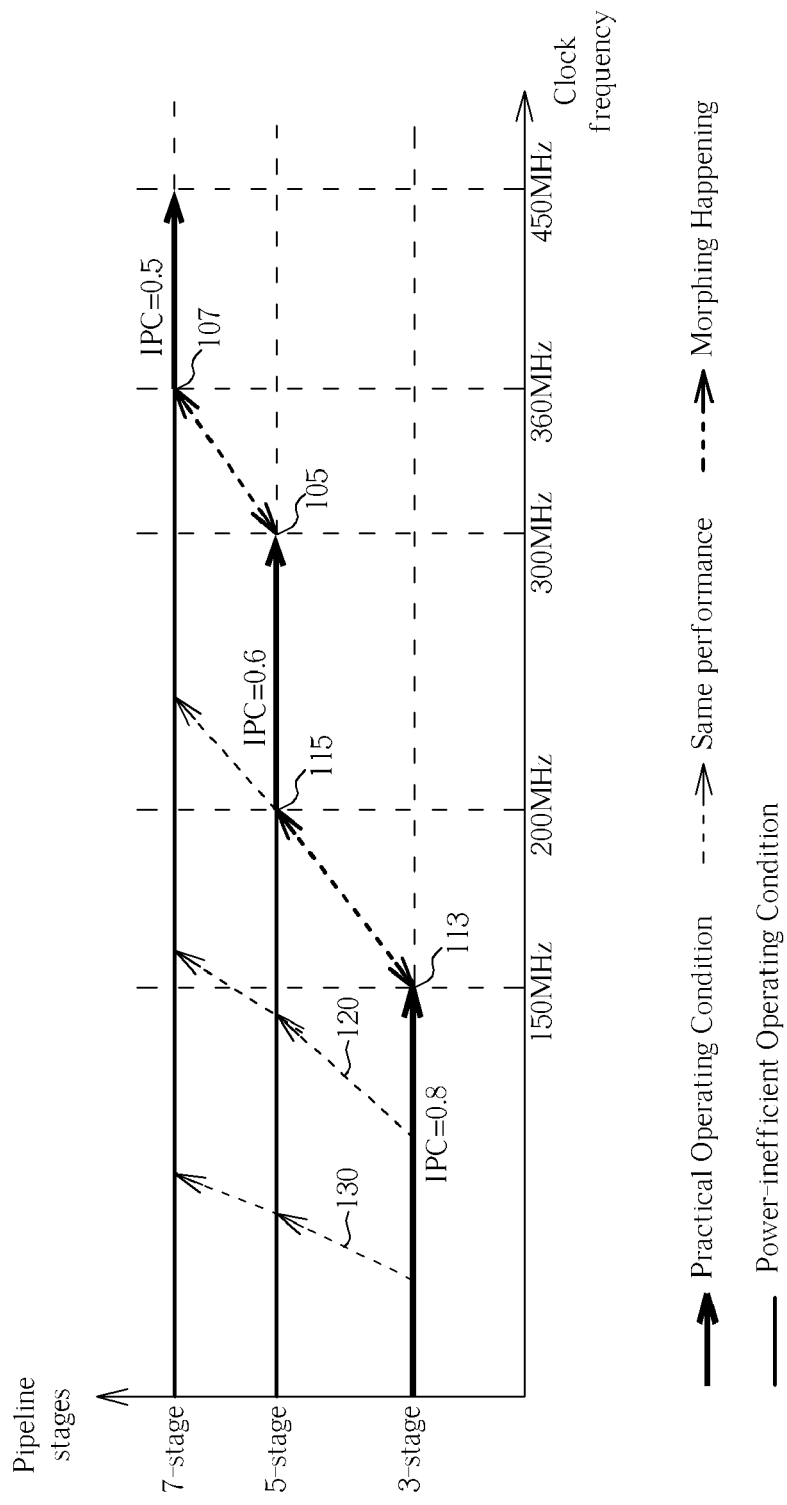
FIG. 1 shows a relationship between performance, pipeline stages, and frequency according to the present invention.

Please refer to FIG. 1, which shows a relationship between performance, pipeline stages, and frequency of modern pipelined processors. The dotted lines in FIG. 1 show equivalent performance levels on a 7-stage pipeline, a 5-stage pipeline and a 3-stage pipeline with respect to particular clock cycle speed (i.e., clock frequency) in MHz. Assume that a 7-stage pipeline achieves an average instruction-per-cycle (IPC) of 0.5, a 5-stage pipeline achieves an average IPC of 0.6, whereas a 3-stage pipeline achieves an average IPC of 0.8. Performance of a processor as defined earlier is proportional to the operating frequency multiplied by the average IPC. From FIG. 1, it can be seen that the performance level 107 of the 7-stage pipeline operating at 360 MHz is equivalent to the performance level 105 of the 5-stage pipeline operating at 300 MHz. Similarly, performance levels 115 and 113 are the same between the 5-stage and 3-stage pipelines, respectively, and performance levels 120 and 130 also exhibit their respective equivalents at each of the staged pipeline designs. At performance level 107, raising the IPC of the processor can be done by moving from a 7-stage pipeline to a 5-stage pipeline, and in doing so, the required clock frequency necessary to achieve an equivalent level of performance is lowered from 360 MHz to 300 MHz. The same change can be done by moving from a 5-stage pipeline to a 3-stage pipeline and lowering the clock frequency from 200 MHz to 150 MHz while keeping performance level 115 at its equivalent level 113. In other words, operating the processor at a higher IPC can effectively lower power consumption in the electronic system while still maintaining the same performance. The reason the power consumption of the electronic system is lowered is because the operating frequency of the system can be lowered while maintaining the same performance level 107 (or 105).

Conversely, with an increase in the number of pipeline stages, the processor can increase the clocking frequency of the logic engine and pipeline stages inside to raise the performance of the processor beyond what would be possible with lower numbers of pipeline stages. The tradeoff, however, is that more pipeline stages and higher frequencies lead to lower instructions per cycle (due to pipeline design issues such as bubbling and branching) as well as higher power consumption (due to increased voltage switching and associated losses).

Prior art processors are unable to adapt their pipeline structures to the needs of the processing applications. Different processing tasks have varying performance requirements: simple applications (such as playing audio or text manipulation) can be most efficient with a short pipeline structure, whereas more demanding tasks (such as video compression or video playback) will benefit from a longer pipeline structure. For less demanding tasks, on the other hand, it is preferable to run at lower frequencies in order to reduce power consumption but doing so with prior art processors would result in lower and unacceptable performance for the more demanding tasks.

A processor of the present invention that performs myriad different tasks is able to morph (that is, to modify or adapt) its number of pipeline stages and its clock speed (frequency) to best suit the immediate applications or tasks to be processed. It should also be noted that although the examples presented in the following depict a processor such as one used in computing devices and its pipeline structure, the application to a processor is not meant to be a limitation of the scope of the present invention. That is, the pipeline morphing described by the present invention can be applied to any logic engine or processing component which utilizes a pipeline structure, and such applications and embodiments also obey the spirit of and should be considered within the scope of the present invention. For example, various types of processors such as central processing units (CPUs), graphics processors, digital signal processors (DSPs), integrated processors, and embedded processors could all benefit and implement the present invention.

Figure 2:
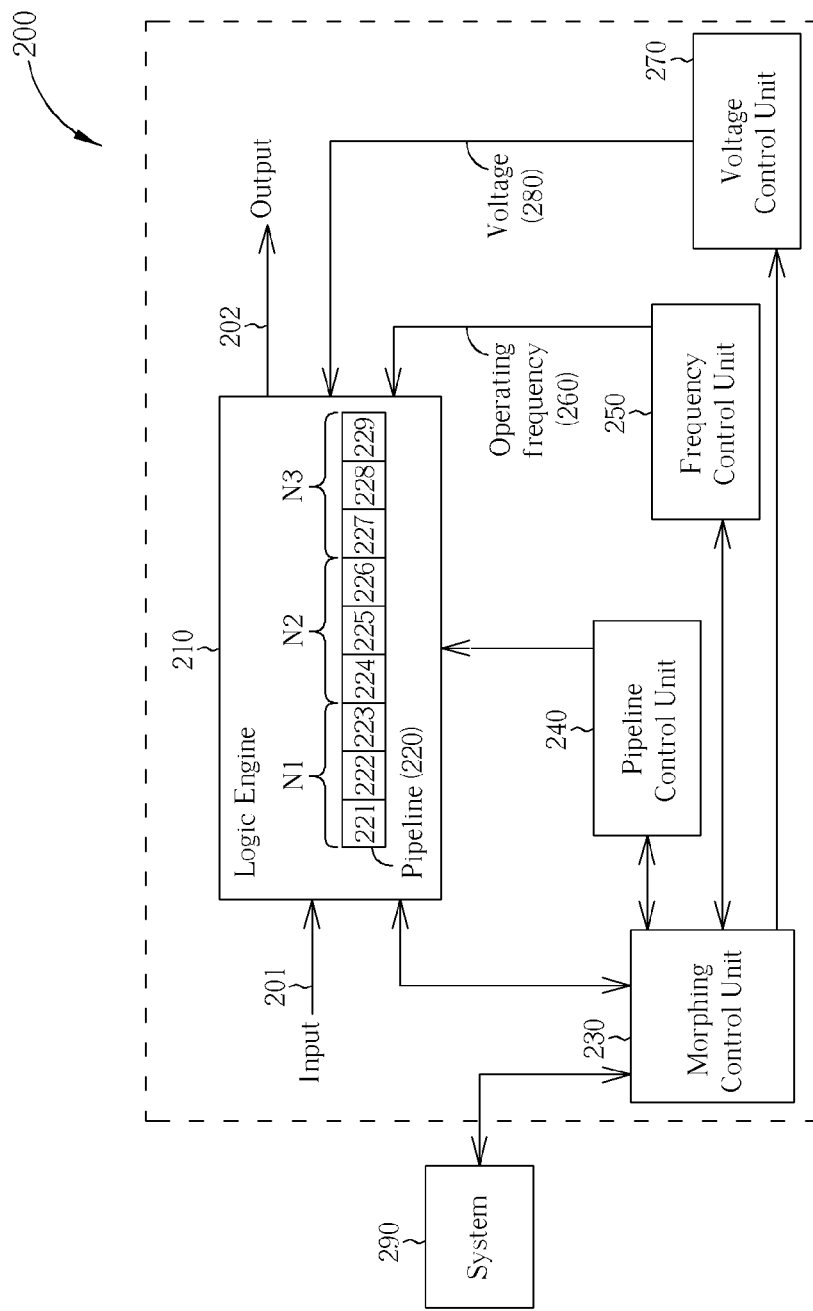
FIG. 2 is a block diagram of an electronic system according to an exemplary embodiment of the present invention.

FIG. 2 is a block diagram of an electronic system 200 according to an exemplary embodiment of the present invention. The electronic system 200 has an input 201 and an output 202 which respectively receive data for processing and send the resultant processed data. The electronic system 200 comprises a logic engine 210, a pipeline 220 having pipeline stages 221-229, a morphing control unit 230, a pipeline control unit 240, a frequency control unit 250, and optionally a voltage control unit 270. Another (optional) system 290 is connected to the electronic system 200.

The logic engine 210 encompasses the pipeline 220, which has a number of pipeline stages 221-229 being coupled in series. The logic engine 210 performs operations of the electronic system 200 by utilizing the pipeline 220, and is coupled to the input 201 and output 202. Each "primitive" pipeline stage (each of pipeline stage 221 through pipeline stage 229) in the pipeline 220 is for outputting data to a next pipeline stage at each cycle of a clock signal running at an operating frequency 260. For example, pipeline stage 221 can output data to pipeline stage 222 at each clock cycle, and pipeline stage 222 in turn can output data to pipeline stage 223 at each clock cycle, et cetera. In addition, each pipeline stage may output data to some of the early pipeline stages or itself at each cycle. Please note that although nine primitive pipeline stages (221-229) are presented in this example, it is an arbitrary selection for illustration purposes only and is not intended as a limitation to the present invention; the number of pipeline stages can be as few as one, or can be many more, as required or desired by the intended applications of the logic engine 210 and/or electronic system 200.

The morphing control unit 230 controls the pipeline control unit 240 to morph (i.e., change) the number of pipeline stages, and is coupled to the pipeline control unit 240 and to frequency control unit 250. The pipeline control unit 240 is coupled to the logic engine 210 and the pipeline 220, and is for changing (i.e., morphing) the number of pipeline stages in the pipeline 220 to a different number of pipeline stages. As is described in detail later, the morphing of pipeline stages can be to increase or decrease the number of pipeline stages 221-229. The frequency control unit 250 is coupled to the morphing control unit 230 and to the logic engine 210 and pipeline 220, and controls the clock frequency of the logic engine 210 and pipeline 220. Regardless of how many pipeline stages are included, each stage can output data to the next stage in the pipeline 220 at each clock cycle.

Figure 3:
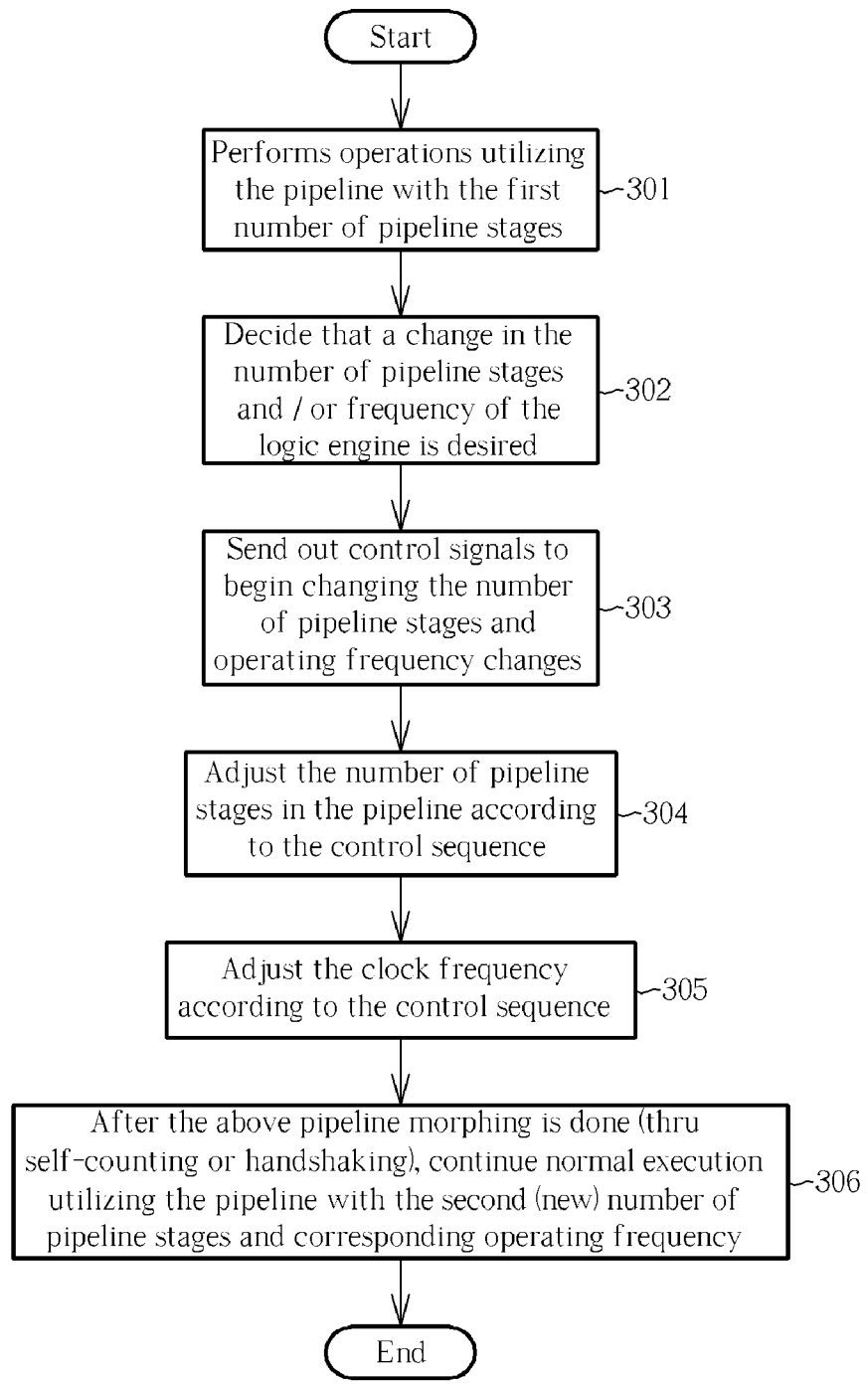
FIG. 3 is a flowchart showing a method of pipeline morphing according to an exemplary embodiment of the present invention.

An accompanying method is further presented for morphing (modifying) a pipeline in an electronic system 200 such as a computing device. FIG. 3 is a flowchart showing a method of pipeline morphing according to an exemplary embodiment of the present invention and includes the following steps as listed below:

Step 301: The logic engine 210 performs operations utilizing the pipeline 220 with the first number of pipeline stages (for example, using nine pipeline stages 221-229 as shown in FIG. 2)

Step 302: The logic engine 210 in system 200 or in another system 290 decides a change in the number of pipeline stages and/or frequency of the logic engine is desired. As will be explained in the following, this decision could occur due to the performance requirements of applications being performed or executed by the system 200. (For example, video operations may require higher performance than audio applications.) The logic engine 210 in electronic system 200 or in another system 290 issues a sequence of control operations to the morphing control unit 230.

Step 303: Upon receiving the indication signal of a change in the number of pipeline stages and frequency from the logic engine 210 or another system 290, the morphing control unit 230 sends out control signals to the pipeline control unit 240 and frequency control unit 250 to begin changing the number of pipeline stages and operating frequency 260, respectively.

Step 304: The pipeline control unit 240 adjusts the number of pipeline stages in the pipeline 220 according to the control sequence. In a first embodiment, the number of pipeline stages is decreased, and in a second embodiment, the number of pipeline stages is increased.

Step 305: The frequency control unit 250 adjusts the clock frequency 260 according to the control sequence. In particular, if the number of stages in the pipeline 220 is reduced, as is shown in FIG. 1, the same performance can be maintained by lowering the operating frequency 260 of the system. In this way, power consumption of the system 200 is reduced. Conversely, if much higher performance is required that is not achievable by a shorter pipeline, the number of stages and the operating frequency can both be simultaneously increased.

Step 306: After the above pipeline morphing is done (thru self-counting or handshaking), the processor (i.e., logic engine 210) can continue its execution. Operations of the electronic system are then performed utilizing the pipeline with the second (new) number of pipeline stages and corresponding operating frequency 260.

To further explain, first, in Step 301, the electronic system 200 is operating normally and the logic engine 210 performs operations utilizing the pipeline 220 with the first number of pipeline stages (e.g., nine pipeline stages 221-229). In a computing device, for example, the processor may be playing a video/movie file, and the video file has completed its run. The electronic system 200 (or another system 290) in Step 302 then decides, based on one or more factors as determined by the morphing control unit 230 for example, that a change in the number of pipeline stages in the pipeline 220 and/or the frequency of the logic engine 220 is desired. This decision can be made utilizing hardware, software, or some combination thereof, and the factors used in its evaluation can be triggered by the type of task assigned to the computing device 200, specific performance requirements, or a change in its operating environment, etc. From the decision of Step 302, the electronic system 200 (or another system 290) issues a sequence of control operations, which could be in the form of an instruction sequence, control register updates, and can be implemented in a hardware state machine, or some combination thereof. Optionally, the morphing control unit 230 may indicate to the logic engine 210 that a pause or stall in execution must occur while pipeline morphing is underway; or alternatively, the processor (i.e., logic engine 210) may complete its current instructions before pausing. In this process, the morphing control unit 230 sends out control signals to the pipeline control unit 240 and/or the frequency control unit 250 at Step 303, instructing the two latter components to begin the pipeline morphing process. Additionally, the morphing control unit 230 can also send control signals to the voltage control unit 270 as will be explained in more details below. The pipeline control unit 240 in Step 304 adjusts the number of pipeline stages in the pipeline 220 whereas in Step 305 the frequency control unit adjusts the clock frequency 260 according to the control sequence. Please note that the morphing control unit 230 may invoke one or both of steps 304 and 305 depending on the performance adjustment requirements of the current operating needs. Please further note that steps 304 and 305 may proceed simultaneously or in sequence. The pipeline control unit 240 and frequency control unit 250 can send feedback to the morphing control unit 230 when the new pipeline stages N1-N3 and/or the new clock frequency of the logic engine 210 have stabilized. Alternatively, the morphing control unit 230 may simply wait for a predetermined amount of time. After the above steps are complete, the processor (i.e., logic engine 210) in step 306 can continue its execution, performing operations of the electronic system 200 utilizing the pipeline 220 with the second (new) number of pipeline stages N1-N3. For example, the second number of pipeline stages could contain three stages N1-N3, wherein the first new stage N1 includes old stages 221, 222, and 223 being fused together; the second new stage N2 includes old stages 224, 225, and 226 being fused together; and the third new stage N3 includes old stages 227, 228, and 229 being fused together. Note that N1 transfers data to N2 at each cycle of the operating frequency 260, and likewise, N2 transfers data to N3 at each cycle of the operating frequency 260. In this way, the pipeline 220 is morphed to include three stages N1-N3 that perform all the same functions in three clock cycles of a lower operating frequency 260 as was originally performed by nine stages 221-229 in nine clock cycles of a higher operating frequency 260.

It is important to note that in the above method, the electronic system 200 is not necessarily required to shutdown or restart in order to utilize the new pipeline 220 stage structure. Additionally, in step 302, the logic engine may not be required to stall its operations; this will depend on the specific implementation of the present invention. More generally, a logic engine 210 or processor has been used in this flowchart and description for illustrative purposes only; the logic engine 210 can be a CPU, a digital signal processor (DSP), or any logic systems utilizing a pipeline structure. The pipeline morphing method of the present invention affects the execution of all operations or instructions of a logic system, and does not morph the pipeline structure depending on each specific operation or instruction. That is, the present invention is for changing the number of pipeline stages in a pipeline for different applications of the system 200 having different performance requirements or power consumption modes.

In the example of a video file that has finished playing, the morphing control unit 230 has determined that lower performance will be acceptable in the current given operating conditions and signals the pipeline control unit 240 and frequency control unit 250 accordingly. The morphing control unit 230 instructs the pipeline control unit 240 to reduce the number of pipeline stages in the pipeline 220 in order to achieve better power economy (i.e., lower power consumption) as illustrated above in FIG. 1. Once a lower-stage pipeline (for example, pipeline 220 having three stages N1-N3) is achieved and the performance of the pipeline is thereby effectively increased, the clock frequency 260 may be slowed to reduce power consumption and maintain original performance. Moreover, as an additional power-saving step, the supply voltage to the logic engine 210 and pipeline structure 220 can be reduced while still maintaining an acceptable level of performance in the current conditions. In this way, the pipeline control unit 240 controls the pipeline 220 to reduce the number of separate stages, the frequency control unit 250 lowers the operating frequency 260 of the clock signal driving the pipeline 220, and the voltage control unit 270 lowers the voltage swing of the supply voltage to the pipeline 220. Such a method for power-saving through dynamically switching to a lower-stage pipeline is unavailable in the prior art, and cannot be obtained without the use of pipeline morphing according to the present invention.

Figure 4:
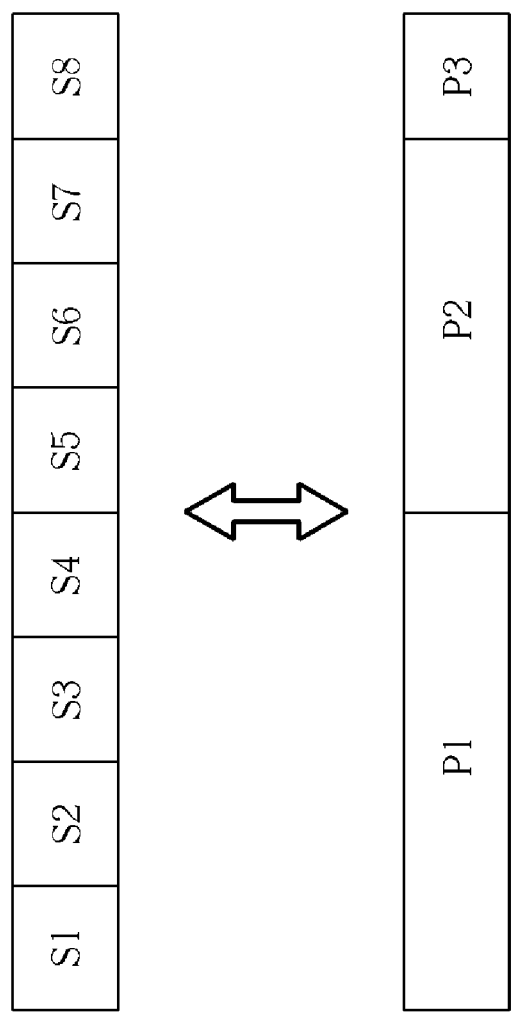
FIG. 4 illustrates fusing and splitting pipeline stages according to the method of FIG. 3.

Pipeline morphing in the present invention performs a change in the number of pipeline stages 221-229 in the pipeline structure 220 of the logic engine 210. The change as shown in FIG. 4 can be an increase or a decrease in the number of pipeline stages. To achieve this change, pipeline morphing in one embodiment of the present invention includes splitting a pipeline stage P1 into a plurality of adjacent pipeline stages S1-S4, or conversely fusing a plurality of adjacent pipeline stages S5-S7 into a single fused pipeline stage P2. FIG. 4 shows an 8-stage pipeline, comprising pipeline stages S1 through S8, being morphed into a 3-stage pipeline consisting of pipeline stages P1 through P3. Alternatively, in the opposite direction, the 3-stage pipeline including pipeline stages P1 through P3 can be morphed into an 8-stage pipeline including pipeline stages S1 through S8. In the example shown in FIG. 4, adjacent pipeline stages S1 through S4 are fused into a fused pipeline stage P1; if instead the 3-stage pipeline is being morphed into the 8-stage pipeline in FIG. 4, pipeline stage P2 must be split into adjacent pipeline stages S5 through S8. It should be noted that the number of pipeline stages in FIG. 4 is for illustration purposes only; the present invention is not limited to a certain number of pipeline stages. Also important to note is that during pipeline morphing, it is possible to employ a combination of both fusing and splitting on the pipeline stages in order to re-structure the pipeline according to the control signals from the morphing control unit. It should also be noted, however, that the number of primitive pipeline stages is the maximum number of pipeline stages that can exist in a particular implementation of a design because primitive pipeline stages cannot be split further. In the example of FIG. 2, the number of primitive pipeline stages is 8, and thus pipeline stages P1 through P3 cannot be split into more than 8 pipeline stages. Furthermore, while the example of FIG. 4 shows a particular arrangement of pipeline stages in the first mode fusing into a particular arrangement of pipeline stages in the second mode, these arrangements are arbitrary, for example purposes only, and should not be taken as a limitation to the scope of the present invention. It is also possible, for instance, that the first mode or the second is not a mode where all pipeline stages are completely split (such as are pipeline stages S1-S8 in FIG. 4); the first and second modes can both be different fused arrangements of the pipeline stages S1-S8 and that the pipeline morphing operation is morphing from one arrangement to another, as seen fit by the electronic system 200 and morphing control unit 230.

Concerning the actual fusing and splitting of pipeline stages, a first embodiment of the present invention is presented below, and illustrated in FIG. 5, wherein pipeline stages can be fused or split by respectively bypassing or un-bypassing an input flip flops for those stages.

Figure 5:
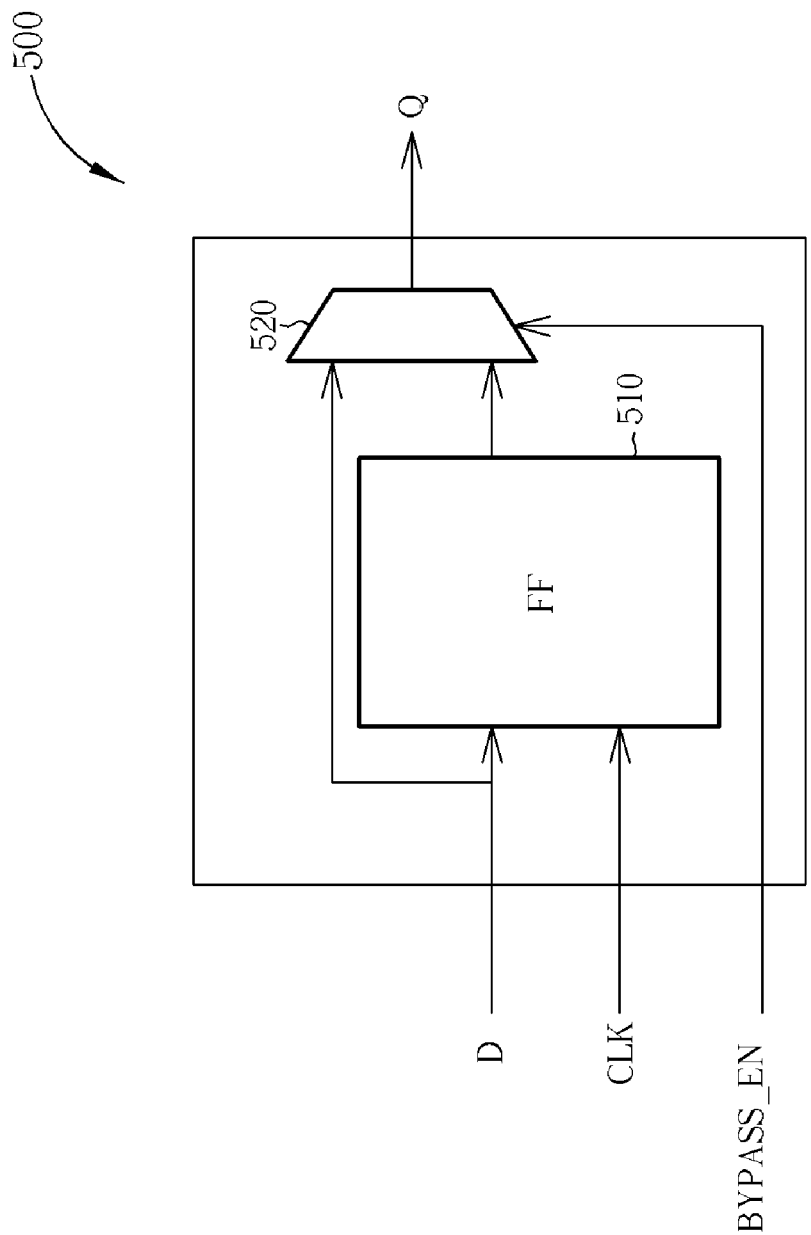
FIG. 5 illustrates the input flip flop which can bypass or un-bypass the pipeline stages of FIG. 2 to fuse or split those stages, respectively.

In this embodiment, each of the pipeline stages S1-S8 contains a set of logic 500 at the beginning of the pipeline stage, each of which is as shown in FIG. 5. Logic 500 includes an input flip flop 510 with an input from the previous pipeline stage output signal D, and an input clock signal CLK. In addition, each of the pipeline stages S1-S8 includes a multiplexer 520 with a first input connected directly to previous pipeline stage output signal D, a second input connected to the output of the input flip flop 510, a selection signal coupled to the pipeline control unit 230 signal BYPASS_EN, and an output Q coupled to the pipeline stage. According to the BYPASS_EN signal line, the multiplexer 520 will select from either the flip flopped output, or the previous pipeline stage output signal D which directly bypasses the input flip flop 510.

When pipeline stages are fused, for example fusing pipeline stages S1-S4 into fused pipeline stage P1 in FIG. 4, the pipeline control unit 240 activates the BYPASS_EN signal line on all adjacent pipeline stages to be fused except for the first stage of the adjacent pipeline stages. That is, on stages S2, S3, and S4 in this example, the activated BYPASS_EN signal line triggers the multiplexers 520 in those stages (S2-S4) to select the input which bypasses the input flip flop 510, passing the result of D directly to its output Q. In effect, the selectively activated BYPASS_EN signal forms a fused pipeline stage which fuses a series of primitive pipeline stages. The data signals between the series of adjacent pipeline stages S2-S4 that have bypassed input flip flops are now directly connected and do not need to wait for the clock signal CLK. For the first of the adjacent pipeline stages, its BYPASS_EN to logic 500 should always be zero so that the next clock cycle CLK triggers the input of the current (fused) pipeline stage from the previous pipeline stage.

Optionally, as shown in FIG. 10, power consumption can be further reduced by gating (i.e., disabling) the clock signal CLK to the bypassed input flip flops 510 in stages S2-S4 according to the BYPASS_EN signal, at each input flip flop 510 or such that a group of input flip flops 510 are gated in unison. As shown in FIG. 10, an AND gate 1000 is utilized to gate the CLK signal for bypassed flip flop 510, which will further reduce power consumption by not clocking unused flip flop 510. Since the concept of clock gating or disabling is commonly known to those skilled in the art, further description is omitted.

When fused pipelines stages are to be split, on the other hand, the pipeline control unit 240 de-activates the BYPASS_EN signal line to those fused pipeline stages which had been previously bypassed. The de-activated BYPASS_EN signal line triggers those multiplexers 520 to select the input which passes through the input flip flop 510, instead of passing the result of D directly to its output Q. In effect, the previously fused pipeline stages are separated again by active input flip flops 510. Optionally, if the clock signal CLK to the input flip flops 510 of all the adjacent pipeline stages were previously gated or disabled, then the signal CLK is returned to trigger as per normal operation.

After reviewing this first embodiment of the present invention, other applications and implementations will be obvious and should be included within the scope of the present invention.

According to a second exemplary embodiment of the present invention, pipeline morphing through pipeline stage fusing and pipeline stage splitting is achieved whereby each pipeline stage is controlled by a dedicated clock with a certain relationship to a main clock signal of the logic engine 210. The second embodiment of the present invention fuses a plurality of adjacent pipeline stages by clocking the first of the adjacent pipeline stages to be fused with the main clock signal and by clocking all primitive pipeline stages in the adjacent pipeline stages, except for the first stage of each adjacent pipeline stage, with phase delayed versions of the main clock signal.

Figure 6:
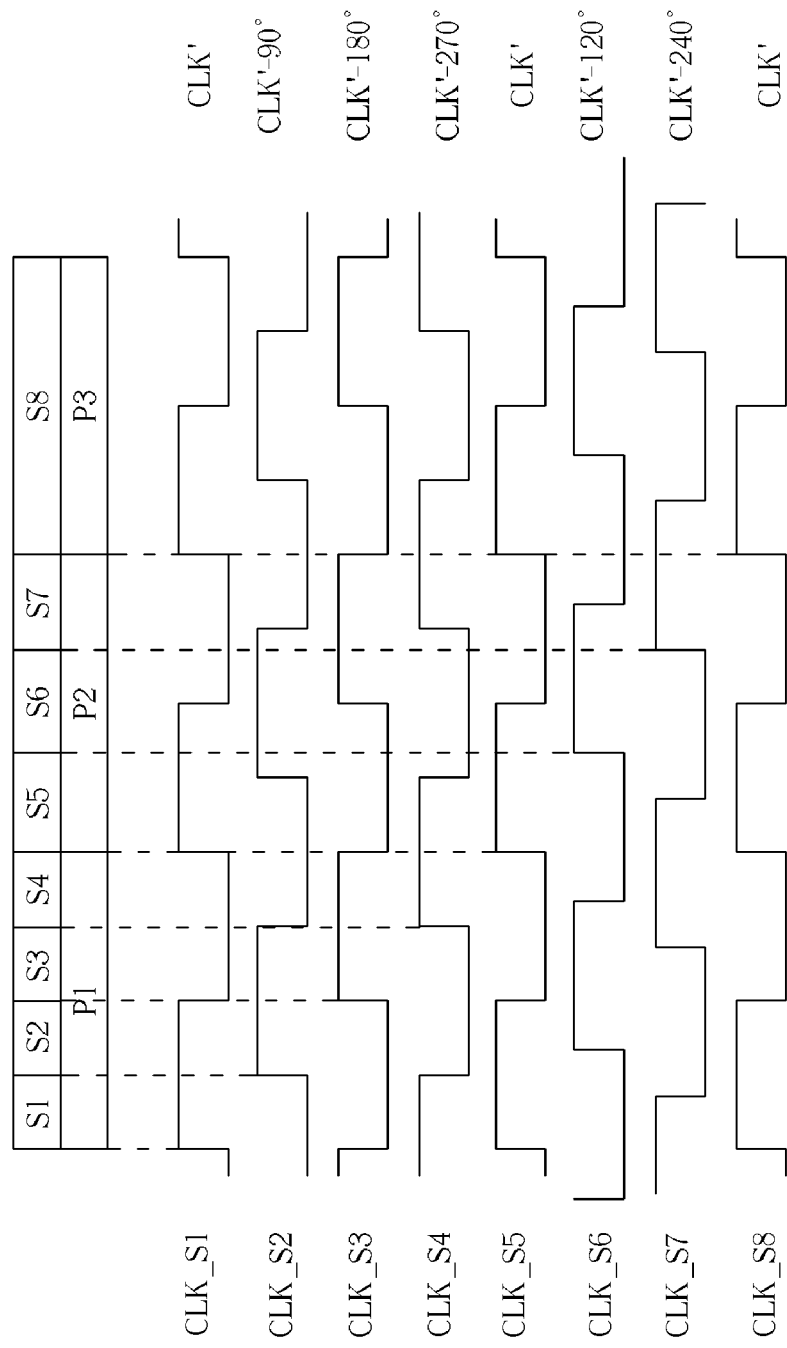
FIG. 6 illustrates utilizing clock phasing to fuse or split the pipeline stages of FIG. 2.

Please recall FIG. 4, which depicts an 8-stage pipeline morphing into a 3-stage pipeline, in conjunction with FIG. 6, which shows a second embodiment of the present invention using clock phasing. In the example of FIG. 4, pipeline stages S1-S4 in the first mode are to be fused into pipeline stage P1 in the second mode, pipeline stages S5-S7 into pipeline stage P2, and S8 becomes pipeline stage P3. According to the second embodiment of the present invention, the pipeline control unit 240 applies the main clock signal to S1, S5, and S8, since those pipeline stages are the first of each set of adjacent pipeline stages to be fused; these clock signals are labeled respectively as CLK_S1, CLK_S5, and CLK_S8 in FIG. 6. Pipeline stages S2-S4 and S6-S7 can then be clocked to certain phase delayed versions of the main clock signal. With regards to the pipeline stage P1 in the second mode, clock signals CLK_S2, CLK_S3, and CLK_S4 respectively provided to pipeline stages S2, S3, and S4 will be phase delayed at 90°, 180°, and 270° with respect to the main clock signal CLK_S1. Likewise for pipeline stage P2 in the second mode, clock signals CLK_S6, and CLK_S7 respectively provided to pipeline stages S6 and S7 will be phase delayed at 120° and 240° with respect to the main clock signal CLK_S5. The result of the second embodiment of the present invention is that a new, lower clock frequency CLK' can be derived, which in the example of FIG. 6 is the same as CLK_S1, CLK_S5, and CLK_S8. In this example, the derivative clock period is substantially equal to the clock period of the longest fused pipeline stage in the second mode; in this example, the derivative clock period is the clock period comprising pipeline stages S1-S4 from the first mode. In this way, at each clock cycle of the non phase delayed clock signal (CLK_S1, CLK_S5, and CLK_S8 in FIG. 6), data from each fused pipeline stage P1, P2, and P3 is passed to a next pipeline stage. Please note that although the current example has shown that clock signals to the adjacent pipeline stages are phase delayed versions of the main clock signal, this is only intended for clarity of explanation and is not meant as a limitation to the present invention.

When splitting the fused pipeline stages into adjacent pipeline stages, a similar process occurs but in reverse. That is, phased delayed clock signals utilized to form a fused pipeline stage are returned to be the same as the main clock signal (i.e., the non phase delayed clock signal). In this way, each cycle of the clock signal will cause data from each of the adjacent pipeline stages to be passed to a next adjacent pipeline stage. It should also be noted that if any of the adjacent pipeline stages is a fused pipeline stage (that is, comprising more than one primitive pipeline stage), the primitive pipeline stages except the first of each adjacent pipeline stage will be clocked by phase delayed versions of the main clock signal.

From this example and after understanding the present invention and its embodiments, other manipulations of the clock signal and its clock frequency should become obvious to those skilled in the art, and those methods should also fall within the scope of the present invention.

Figure 7:
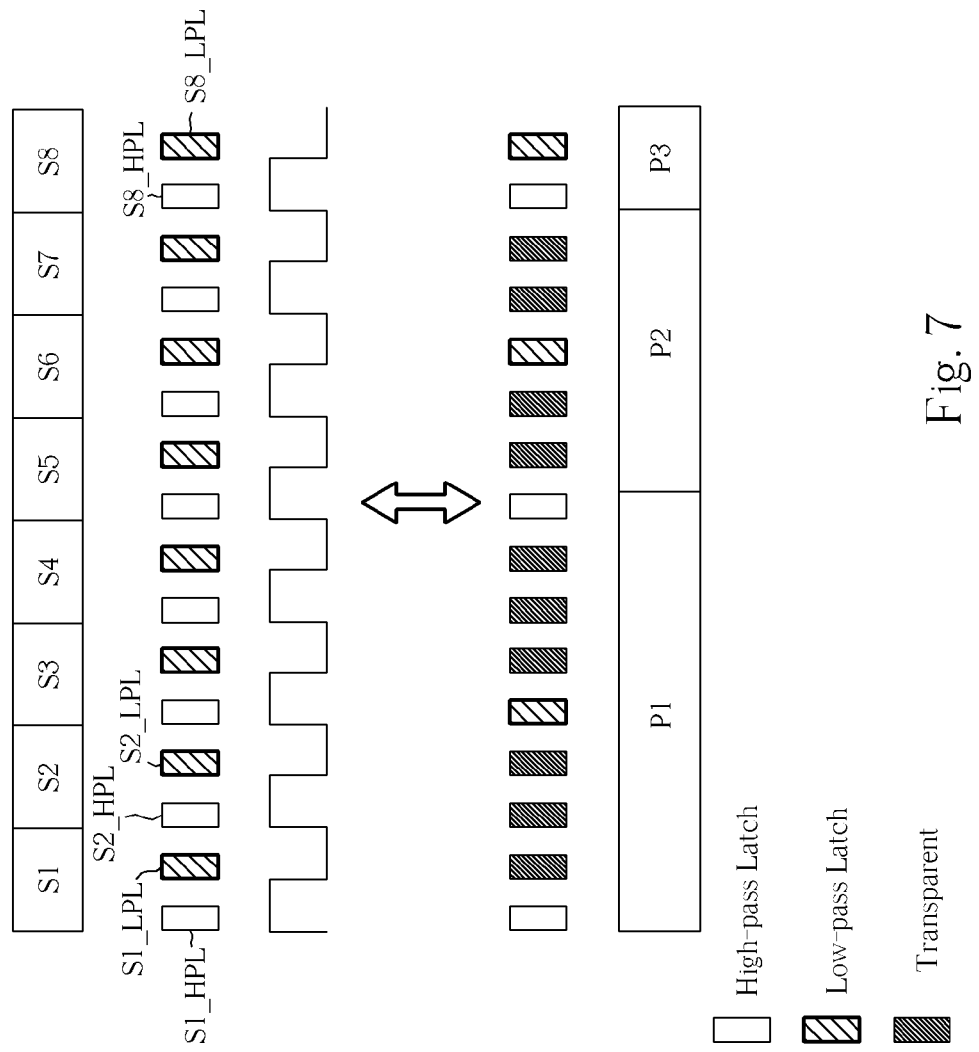
FIG. 7 illustrates utilizing latches to fuse or split the pipeline stages of FIG. 2.

A third embodiment of the present invention is further presented wherein each pipeline stage in the pipeline is implemented using latches. Please refer to FIG. 7, which is an example according to a third embodiment of the present invention. In FIG. 7, pipeline stages S1 through S8 are implemented with latches, each pipeline stage consisting of two latches: one high-pass latch (collectively labeled S1_HPL, S2_HPL, . . . , S8_HPL), and one low-pass latch (collectively labeled S1_LPL, S2_LPL, . . . , S8_LPL).

Figure 8:
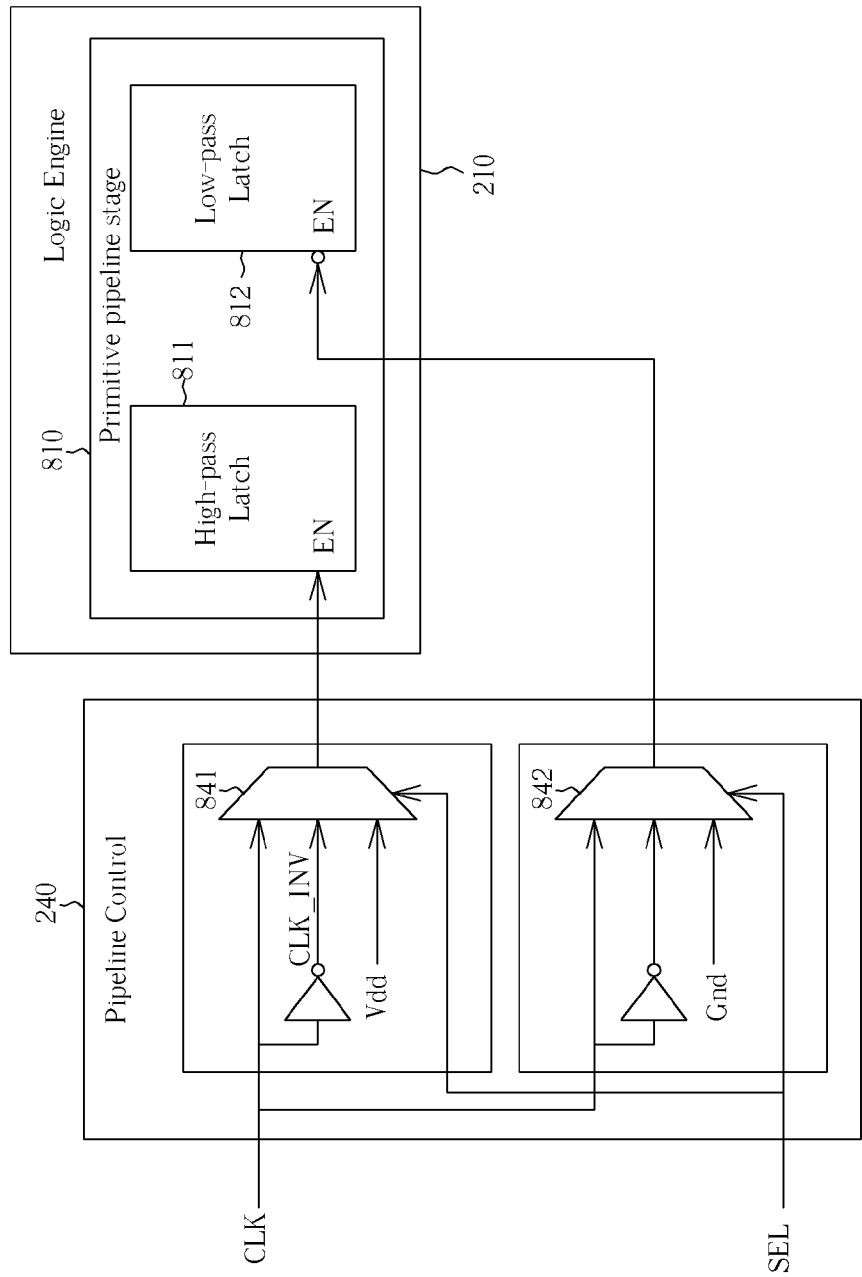
FIG. 8 shows the latch circuitry utilized to control the input of the pipeline stages in FIG. 7.
Figure 9:
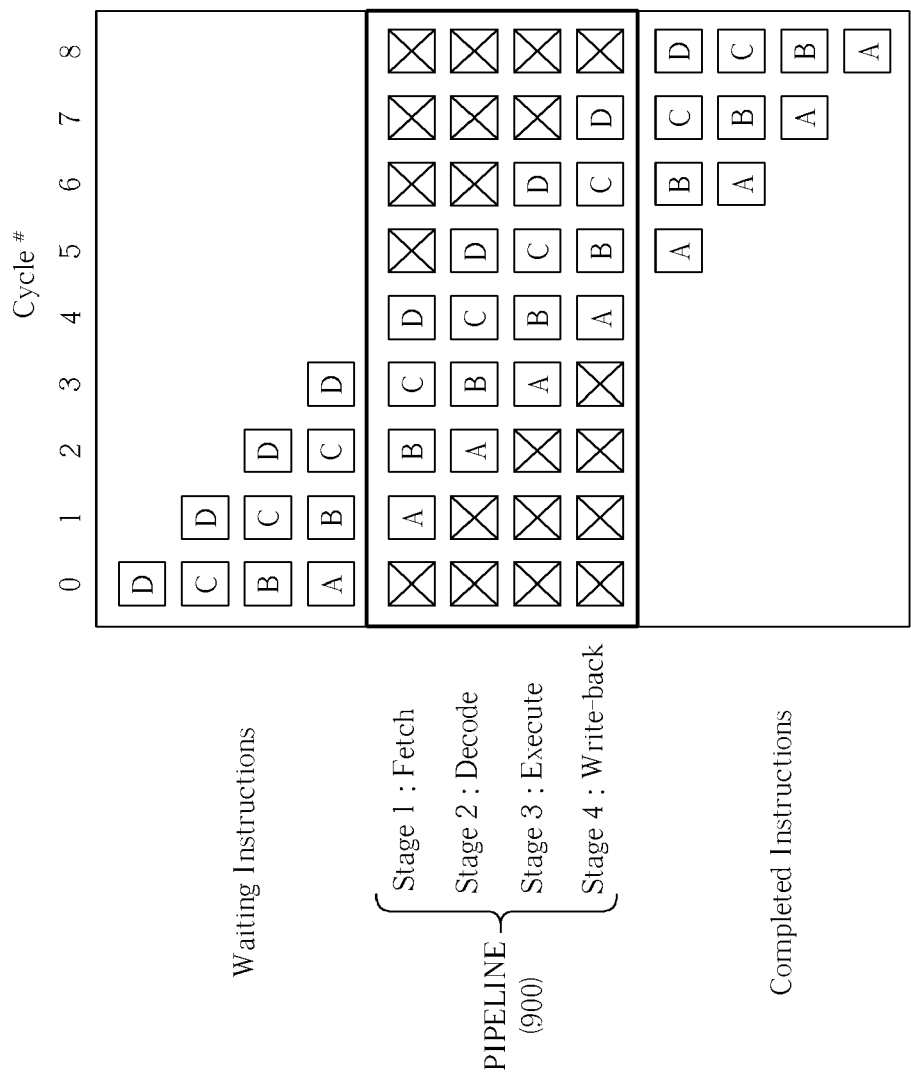
FIG. 9 shows a typical instruction pipeline for a central processing unit (CPU) according to the related art.

The circuit of FIG. 8 shows one implementation of the third embodiment of the present invention. In FIG. 8, the pipeline control unit 240 is substantially equal in function to the pipeline control unit with the corresponding number in FIG. 2, whereas the logic engine 210 is also substantially the same unit as the logic engine 210 in FIG. 2. In the logic engine 210 in FIG. 8, a primitive pipeline stage 810 is shown. In this implementation, each latch (or each group of pipelined latches) is coupled to a multiplexer (MUX) 841 or 842 which has as inputs coupled to the clock signal CLK, an inverted clock signal CLK_INV, and a third input coupled to either a "high" voltage Vdd or a ground voltage Gnd. Each MUX 841 or 842 also has a selector signal SEL coupled to the pipeline control unit 240, and an output to either a high-pass latch 811 or a low-pass latch 812 in the logic engine 210. With the circuit described above, the pipeline control unit 240 controls the behavior of each latch 811, 812 to be one of a high-pass latch, a low-pass latch, or a transparent latch by utilizing the control signal SEL to control the MUX 841, 842. Please note that in FIG. 8, one of each a high-pass latch and a low-pass latch are illustrated as an example implementation for each configuration.

In such an implementation, with the example of FIG. 7 in mind, the pipeline control unit 240 fuses the adjacent pipeline stages S1-S4 in the first mode into pipeline stage P1 in the second mode by configuring the first latch in pipeline stages S1-S4 to be a high-pass latch, configuring another latch in the adjacent pipeline stages S1-S4 to be a low-pass latch, and then configuring all other latches in the adjacent pipeline stages to be transparent. In this example, a "mid-point" latch is chosen as the low-pass latch, with three transparent latches both before and after the low-pass latch, but this is not a requirement of the third embodiment of the present invention. The same process is continued with pipeline stages S5-S7 in the first mode to create fused pipeline stage P2 in the second mode, where in this example the high-pass latch and low-pass latch are each followed by two transparent latches. By re-configuring the latches of pipeline stages S1-S7, the fused pipeline stages P1 and P2 each include a single high-pass latch, a single low-pass latch, and zero or more transparent latches. Please note that, as shown in the case of pipeline stage S8 in the first mode and pipeline stage P3 in the second mode, there may be no other latches to configure as transparent; this also falls within the scope of the present invention.

If the pipeline morphing sequence requires a splitting of fused pipeline stages, the same procedure as described above occurs: the latches of the adjacent pipeline stages to be split are configured such that each of the split adjacent pipeline stages includes a single high-pass latch, a single low-pass latch, and any other latches are configured to be transparent. As this splitting process should be clear to those skilled in the art after reviewing the above disclosure, further description of the process of splitting pipeline stages is omitted for brevity.

It is an advantage of the present invention that an electronic system can morph its pipeline structure to construct a different number of pipeline stages according to different applications or other system requirements. A pipeline clock signal and a pipeline supply voltage can also be altered according to how many stages are in the pipeline in order to reduce power consumption requirements or increase performance as required.

Those skilled in the art will readily observe that numerous modifications and alterations of the device and method may be made while retaining the teachings of the invention.

What is claimed is:

1. An electronic system comprising:
  a pipeline operating in a first mode with a first number of operation stages being coupled in series, operating in a second mode with a second number of operation stages being coupled in series, and operating in a third mode with a third number of operation stages being coupled in series, wherein in the first mode all operation stages are primitive stages, and in a second mode and in a third mode each operation stage is a primitive stage or is fused from two or more adjacent primitive stages in the first mode;
  a main clock signal applied to each operation stage; and
  a pipeline control unit for controlling the pipeline and generating output data, wherein for each operation stage with two or more primitive stages, the main clock signal clocks the first primitive stage, and the pipeline control unit generates a set of sequentially increasing phase-delayed versions of the main clock signal having the same period as the main clock signal to clock each subsequent primitive stage respectively, wherein each operation stage outputs data to a next operation stage at each cycle of the main clock signal.

2. The electronic system of claim 1, wherein the pipeline is a pipeline of a processing unit, and the operations of the electronic system are operations of the processing unit.

3. The electronic system of claim 1, wherein the pipeline control unit is further for dynamically changing the operation stages in the pipeline from the second number to the third number and adjusting the period of the main clock signal as the electronic system is operating.

4. The electronic system of claim 1, further comprising a morphing control unit for controlling the pipeline control unit to decrease the number of the operation stages in the pipeline for applications of the electronic system having lower performance requirements.

5. The electronic system of claim 1, further comprising a morphing control unit for controlling the pipeline control unit to increase the number of the operation stages in the pipeline for applications of the electronic system having higher performance requirements.

6. The electronic system of claim 1, wherein an operation stage is fused from two or more adjacent primitive stages, the period of the main clock signal is no smaller than the phase delay for the last primitive stage.

7. A method for controlling a pipeline of an electronic system to change its number of operation stages, the method comprising:

providing a pipeline operating in a first mode with a first number of operation stages being coupled in series, operating in a second mode with a second number of operation stages being coupled in series, and operating in a third mode with a third number of operation stages being coupled in series, wherein in the first mode all operation stages are primitive stages, and in a second mode and in a third mode each operation stage is a primitive stage or is fused from two or more adjacent primitive stages in the first mode;

applying a main clock signal to each operation stage; and controlling the pipeline and thereby generating output data, wherein for each operation stage with two or more primitive stages, the main clock signal clocks the first primitive stage, and the pipeline control unit generates a set of sequentially increasing phase-delayed versions of the main clock signal having the same period as the main clock signal to clock each subsequent primitive stage respectively; and outputting data from each operation stage to a next operation stage at each cycle of the main clock signal.

8. The method of claim 7, further comprising dynamically changing the operation stages in the pipeline from the second number to the third number and adjusting the period of the main clock signal as the electronic system is operating.

9. The method of claim 7, further comprising decreasing the number of the operation stages in the pipeline for applications of the electronic system having lower performance requirements.

10. The method of claim 7, further comprising increasing the number of the operation stages in the pipeline for applications of the electronic system having higher performance requirements.

11. The method of claim 7, wherein an operation stage is fused from two or more adjacent primitive stages, the period of the main clock signal is no smaller than the phase delay for the last primitive stage.

* * * * *